United States Patent
Pöyhönen et al.

(10) Patent No.: US 7,599,374 B2
(45) Date of Patent: Oct. 6, 2009

(54) SYSTEM AND METHOD FOR ESTABLISHING AN INTERNET PROTOCOL CONNECTION WITH A TERMINATING NETWORK NODE

(75) Inventors: Petteri Pöyhönen, Helsinki (FI); Seppo Pohja, Tampere (FI); Ritva Sirén, Helsinki (FI); Jean-Francois Maion, Espoo (FI); Jari Mononen, Ruutana (FI); Petri Nykänen, Nokia (FI)

(73) Assignee: Nokia Corporation, Espoo (FI)

( * ) Notice: Subject to any disclaimer, the term of this patent is extended or adjusted under 35 U.S.C. 154(b) by 989 days.

(21) Appl. No.: 10/797,529

(22) Filed: Mar. 10, 2004

(65) Prior Publication Data

US 2005/0201370 A1    Sep. 15, 2005

(51) Int. Cl.
  *H04L 12/56* (2006.01)
  *H04J 3/16* (2006.01)
  *G06F 15/16* (2006.01)

(52) U.S. Cl. .................. 370/395.2; 370/400; 370/466; 709/227

(58) Field of Classification Search .............. 348/14.01; 370/230, 252, 236, 352, 395, 401, 412, 417, 370/463, 474, 503; 709/227, 228, 229
See application file for complete search history.

(56) References Cited

U.S. PATENT DOCUMENTS

| | | | |
|---|---|---|---|
| 6,618,757 B1 | 9/2003 | Babbitt et al. | |
| 6,636,491 B1 | 10/2003 | Kari et al. | |
| 6,690,407 B1 * | 2/2004 | Parker et al. | 348/14.01 |
| 6,910,074 B1 * | 6/2005 | Amin et al. | 709/227 |
| 6,961,575 B2 | 11/2005 | Stanforth | |
| 7,177,636 B2 | 2/2007 | Oda et al. | |

(Continued)

FOREIGN PATENT DOCUMENTS

JP    2003179603 (A)    6/2003

(Continued)

OTHER PUBLICATIONS

P. Srisuresh; *Traditional IP Network Address Translator (Traditional NAT)*; Jan. 2001; 15 pages; REC 3022; The Internet Society (2001); available at <http://www.ietf.org/rfc/rfc3022.txt?number=3022> (visited Nov. 20, 2003).

(Continued)

*Primary Examiner*—Tri H Phan
(74) *Attorney, Agent, or Firm*—Alston & Bird LLP

(57) ABSTRACT

A system for establishing an Internet Protocol (IP) connection with a terminating node includes an originating node capable of initiating communication with the terminating node. The system also includes an intermediate node located between the originating node and the terminating node. The originating node is capable of initiating communication by either (a) requesting communication with the terminating node via the intermediate node, or (b) notifying the terminating node of incoming data independent of the intermediate node. In this regard, when the originating node initiates communication in accordance with (a), either the originating node or the intermediate node is capable of notifying the terminating node of incoming data. Upon being notified of incoming data, then, the terminating node is capable of registering with the intermediate node to thereby establish an IP connection between the originating node and the terminating node via the intermediate node.

59 Claims, 7 Drawing Sheets

U.S. PATENT DOCUMENTS

| | | |
|---|---|---|
| 2001/0005675 A1 | 6/2001 | Aho |
| 2001/0034767 A1 | 10/2001 | Aho |
| 2002/0126701 A1 | 9/2002 | Requena |
| 2002/0138622 A1 | 9/2002 | Dorenbosch et al. |
| 2002/0196782 A1* | 12/2002 | Furukawa et al. ............ 370/352 |
| 2003/0058839 A1* | 3/2003 | D'Souza ..................... 370/352 |
| 2003/0058874 A1 | 3/2003 | Sahaya et al. |
| 2003/0112793 A1 | 6/2003 | Sengodan |
| 2003/0154293 A1 | 8/2003 | Zmolek |
| 2003/0206536 A1 | 11/2003 | Maggeti |
| 2004/0003058 A1 | 1/2004 | Trossen |
| 2004/0024879 A1 | 2/2004 | Dingman et al. |
| 2004/0044777 A1 | 3/2004 | Alkhatib et al. |
| 2006/0025141 A1 | 2/2006 | Marsh et al. |

FOREIGN PATENT DOCUMENTS

| | | |
|---|---|---|
| WO | WO 02/09387 A1 | 1/2002 |
| WO | WO 03/088625 A1 | 10/2003 |

OTHER PUBLICATIONS

Matt Smith, Ray Hunt; *Network Security using NAT and NAPT*; 2002; 16 pages.

*Network Initiated Data Session (NIDS)—Stage 1 Requirements*; 2003; 10 pages; 3GPP2.P0090-0, Version 0.2; S10-20030512-008; San Diego, California.

J Rosenberg, H. Schulzrinne, G. Camarillo, A. Johnston, J. Peterson, R. Sparks, M. Handley, E. Schooler; *SIP: Session Initiation Protocol*; Jun. 2002; 202 pages; RFC 3261; The Internet Society (2002).

Suzuki, "Study on Mobile IP Applied Network Services for Enterprise User", *IEICE Technical Report*, vol. 102, No. 692, pp. 315-318, Feb. 28, 2003.

Kuroki, "A Study on Control Method of a Firewall Function in SIP Application Level Gateway (SIP-ALG)", *IEICE Technical Report*, vol. 102, No. 691, pp. 105-108, Feb. 27, 2003.

Japanese Office Action for Application No. 2007-502432.

* cited by examiner

```
NAME:

SEVERI VIRTANEN
KARI VITIKAINEN
STEVEN WATKINS
```

FIG. 6A.

```
NAME:
SEVERI VIRTANEN

PHONE NUMBER:
555-555-5555
```

FIG. 6B.

```
NAME:
SEVERI VIRTANEN

DNS HOST NAME:
SEVERI.VIRTANEN.MYPHONE.NET
```

FIG. 6C.

SYSTEM AND METHOD FOR ESTABLISHING AN INTERNET PROTOCOL CONNECTION WITH A TERMINATING NETWORK NODE

FIELD OF THE INVENTION

The present invention generally relates to systems and methods for communicating in accordance with Internet Protocol (IP) and, more particularly, to systems and methods for establishing an IP connection with a terminating network node.

BACKGROUND OF THE INVENTION

One of the limitations of various versions of the Internet Protocol (IP) such as IPv4, is that it has a limited address space. Consequently, in order to conserve addresses, enterprises and other administrative domains have resorted to using private addresses. Private addresses are network addresses in which the IP address falls within the ranges of 10.0.0.0-10.255.255.255,
172.16.0.0-172.31.255.255, or
192.168.0.0-192.168.255.255.

Private addresses that are assigned by an administrative entity within a private network only have relevance within the respective private network. Accordingly, such private addresses are typically not visible outside the private network. An advantage of using private addresses, however, is that different private networks may assign the same private IP address to hosts within their respective private networks without any concern of conflict. On the other hand, a Network Address Translator (NAT), which can also function as Network Address Port Translator (NAPT), can be used when a host that is assigned a private address within a private network intends to send an IP datagram to a host that is outside the private network of the sending host. A NAT transforms a private IP address (and possibly other selected fields within the datagram) into a public IP address prior to the IP datagram being sent outside the private network associated with the NAT. With the added functionality of the NAPT, the NAT can further transform ports, such as Transmission Control Protocol (TCP) or User Datagram Protocol (UDP) ports, from the private network to the public network. Similarly, when an IP datagram is sent from a host that is outside the administrative domain associated with the NAT to a host with a private address, then the NAT transforms a public IP address to a private IP address and, with the NAPT added functionality, a port in the public network to a port in the private network.

In addition to providing address and port translations, the NAT can communicate with a firewall and/or gateway that operates as a security mechanism to an associated private network. In this regard, the firewall/gateway can operate to provide security in that, as before incoming datagrams pass through a translation process of the NAT and/or after outgoing datagrams pass through a translation process of the NAT, the firewall/gateway can be capable of qualifying such datagrams. In addition, by translating private IP addresses into public IP addresses, the NAT can be capable of providing a measure of privacy for those associated with the private IP addresses.

The use of private addresses within a private network and use of a NAT at the edge of a private network has been widely adopted and deployed within enterprises. There are, however, drawbacks associated with use of a NAT. In this regard, consider a private network comprising, connected to or otherwise associated with a mobile network, such as a general packet radio service (GPRS) network. In such instances, a terminating node, such as a mobile terminal, communicating across the mobile network can generally initiate a packet-switched (e.g., IP) connection with an IP device across the NAT. An IP device typically cannot, however, initiate a similar packet-switched connection with the terminating node across the NAT. In addition, because terminating nodes typically lack a static and public identity like a fixed IP-address, IP devices often cannot identify a desired terminating node to the NAT.

Mobile networks are typically configured in a manner that prevents an IP device from initiating a packet-switched connection with a respective terminating node for a number of reasons. Firstly, depending upon the mobile network topology, enabling IP-connectivity to terminating nodes within the mobile network can consume an undesirable amount of resources or reduce performance of the mobile network even when there is no IP-traffic across the mobile network. Secondly, in the mobile network, as in many private networks, there may be more terminating nodes than available IP-addresses. As such, the mobile network may include a NAT, dynamically allocated IP addresses and/or private IP addresses. Thirdly, the security needs and policies of many mobile networks require that various IP-traffic be prevented from passing into the mobile network. Such an instance also often leads to the use of the NAT, particularly when the mobile networks include an associated firewall/gateway.

To overcome the drawback of the NAT to permit IP devices to initiate an IP connection with a terminating node, mobile networks can be configured such that each terminating node has a unique, fixed IP address, where those addresses are entered into a respective domain name system (DNS) server. The NAT and any security components (e.g., firewall/gateway, etc.) of the mobile network can also be configured to allow an IP device to initiate an IP connection with a terminating node and allow routing of traffic to and from the IP address allocated to the terminating node. In addition, for example, network technology-specific resources required for IP connectivity with each terminating node in the mobile network can be allocated when the terminating node is connected to the mobile network.

Such a technique for permitting IP devices to initiate an IP connection with a terminating node, however, ignores the limitations of public networks that lead to the use of NAT components. Namely, such a technique ignores the limitation of available public IP addresses. Also, such a technique ignores the ability of NAT components to communicate with firewalls/gateways, which provide security functionality. Thus, it would be desirable to design a system capable of permitting IP devices to initiate an IP connection with a terminating node in a mobile network that accounts for the limited address space of public networks and maintains firewall and/or gateway functionality to the mobile network.

SUMMARY OF THE INVENTION

In light of the foregoing background, embodiments of the present invention provide an improved system and method for establishing an Internet Protocol (IP) connection with a terminating node, such as a mobile terminal having an associated private IP address. In contrast to conventional techniques for establishing an IP connection with a terminal, embodiments of the present invention permit IP devices across a public network from the terminating node to initiate an IP connection with the terminating node. More particularly, embodiments of the present invention permit IP devices to initiate an IP connection with the terminating node in a manner that accounts for the limited number of available public IP addresses, and maintains firewall and/or gateway functionality to the mobile network including the terminal.

According to one aspect of the present invention, a system is provided for establishing an Internet Protocol (IP) connection with a terminating node. The system includes an originating node capable of initiating communication with the terminating node. The system also includes an intermediate node located between the originating node and the terminating node. The originating node is capable of initiating communication with the terminating node in a manner based upon at least one parameter for communication with the intermediate node and/or the terminating node. In this regard, the originating node is capable of initiating communication by either (a) requesting communication with the terminating node via the intermediate node, or (b) notifying the terminating node of incoming data independent of the intermediate node. In this regard, when the originating node initiates communication in accordance with (a), either the originating node or the intermediate node is capable of notifying the terminating node of incoming data. Irrespective of the manner of notifying the terminating node, however, upon being notified of incoming data, the terminating node is capable of registering with the intermediate node to thereby establish an IP connection between the originating node and the terminating node via the intermediate node.

When the originating node initiates communication in accordance with (b), the originating node can be capable of notifying the terminating node of incoming data further in accordance with a non-IP-based communication technique. Alternatively, when the originating node initiates communication in accordance with (a), the originating node or the intermediate node can be capable of notifying the terminating node of incoming data further in accordance with a non-IP-based communication technique. In either instance, however, the non-IP based communication can comprise oral communication, text messaging, radio frequency (RF) communication, short messaging service (SMS) communication, multimedia messaging service (MMS) communication, and/or instant messaging.

Similarly, when the originating node initiates communication in accordance with (b), the originating node can be capable of notifying the terminating node of incoming data further in accordance with a wireless communication technique (e.g., Bluetooth, WLAN, etc.). Alternatively, when the originating node initiates communication in accordance with (a), the originating node or the intermediate node can be capable of notifying the terminating node of incoming data further in accordance with a wireless communication technique. As will be appreciated, then, the originating node can be capable of initiating communication, and thereafter communicating, with the terminating node in accordance with a plurality of different communication techniques.

The originating node can request communication with the terminating node in any of a number of different manners. For example, the originating node can be capable of requesting communication with the terminating node via the intermediate node sending a domain name service (DNS) query to at least one of a plurality of DNS servers to thereby trigger the DNS server(s) to communicate with the intermediate node to request communication with the terminating node. More particularly, for example, the originating node can send the DNS query to a first DNS server, with a second DNS server being capable of communicating with the intermediate node to request communication with the terminating node. In such instances, the second DNS server can comprise the first DNS server or another DNS server.

Similarly, the originating node or the intermediate node can notify the terminating node of incoming data in any of a number of different manners. In various instances, the originating node comprises a mobile terminal or a fixed terminal. Thus, for example, the mobile terminal or fixed terminal can be capable of notifying the terminating node of incoming data. In various other instances, the originating node or the intermediate node comprises a Session Initiation Protocol (SIP) client. In such instances, in an alternative example, the SIP client can be capable of communicating with a SIP proxy to thereby trigger the SIP proxy to notify the terminating node of incoming data.

In yet another alternative, the system can further include a network address translator (NAT) and/or a firewall (FW) located between the intermediate node and the terminating node. In this alternative example, the originating node or the intermediate node can be capable of communicating with the NAT and/or FW to thereby trigger the NAT and/or FW to notify the terminating node of incoming data. More particularly, for example, the originating node or the intermediate node can be capable of communicating with the NAT and/or FW such that the NAT and/or FW communicates with a network gateway support node (e.g., GGSN) to thereby trigger the network gateway support node to notify the terminating node of incoming data. In a further alternative example, the originating node or the intermediate node can be capable of communicating with another network node to thereby trigger the other network node to notify the terminating node of incoming data.

The intermediate node can be capable of establishing a tunnel with the terminating node such that the originating node can be capable of communicating with the terminating node at least partially via the tunnel. In such instances, the intermediate node can further be capable of assigning a public IP address to the terminating node such that the originating node is capable of communicating with the terminating node by sending data based upon the public IP address of the terminating node assigned by the intermediate node. Additionally or alternatively, the intermediate node can, but need not, be capable of establishing the tunnel based upon a registration message from the terminating node via a NAT and/or FW located between the intermediate node and the terminating node. The originating node can therefore be capable of communicating with the terminating node at least partially via the tunnel, such as in a manner independent of the NAT and/or FW.

Alternatively, the terminating node can be capable of registering with the intermediate node, which creates a registration entry that includes a public IP address assigned to the terminating node, such as a public IP address assigned by the NAT. Additionally, the registration entry can include a public IP address of the originating node in instances in which the terminating node registers with the intermediate node in response to a notification of incoming data. In instances where the intermediate node creates a registration entry, the originating node can be capable of communicating with the terminating node such that the intermediate node operates as a proxy based upon the registration entry.

More particularly, the intermediate node can be capable of receiving data from the originating node, and thereafter forwarding the data based upon a public IP address assigned to the terminating node by a NAT. The NAT can then transform the public IP address assigned to the terminating node into a private IP address associated with the terminating node, and forward the data from the NAT to the terminating node based upon the private IP address of the terminating node. According to another aspect of the present invention, a system is provided that includes a NAT. According to this aspect, the NAT is capable of receiving a connection request from a network node, and in response to the connection request, notifying the terminating node of incoming data. As such, the NAT permits the originating node to establish an IP connection with the terminating node via an intermediate node. More particularly according to this aspect, when the terminating node is located within the mobile network, the NAT can be capable of sending a notification to a network gateway support node of the mobile network (e.g., a gateway General Packet Radio Service support node (GGSN)) such that the network gateway support node notifies the terminating node of incoming data. In this manner, the originating node can be permitted to initiate communication with the terminating node.

According to other aspects of the present invention, a terminal, terminating node and method for establishing an IP connection with a terminal are provided. Therefore, embodiments of the present invention provide an improved system and method for establishing an IP connection with a terminal. Embodiments of the present invention permit an IP device (i.e., originating node) to initiate a connection with a terminal (i.e., terminating node) without requiring additional, or many additional, public IP addresses. Embodiments of the present invention further permit an IP device to initiate a connection with a terminal without obviating firewall and/or gateway functionality otherwise provided to a mobile network including the terminal, such as by a NAT. Therefore, the system and method of embodiments of the present invention solve the problems identified by prior techniques and provide additional advantages.

BRIEF DESCRIPTION OF THE DRAWINGS

Figure 1:
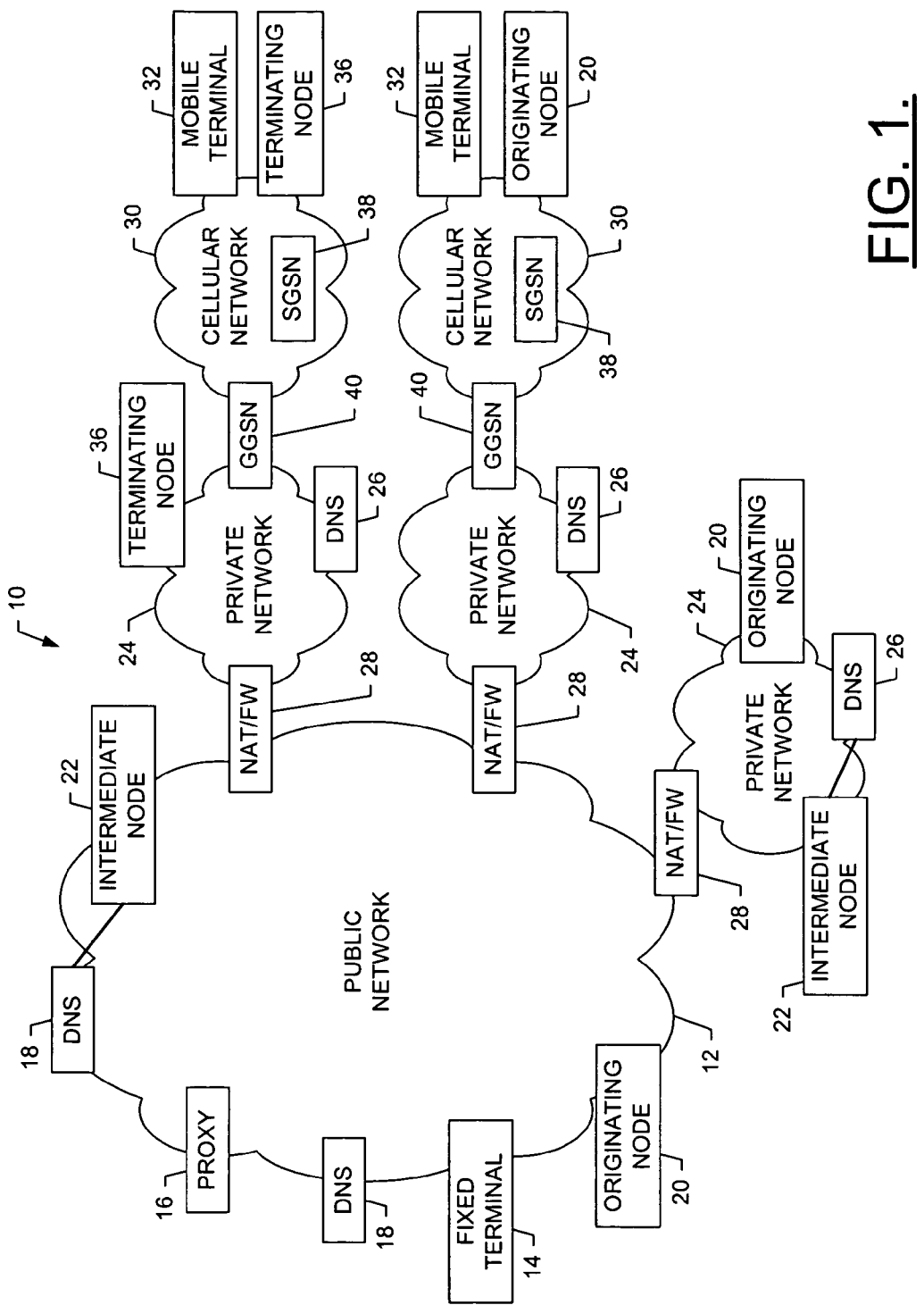
Figure 2:
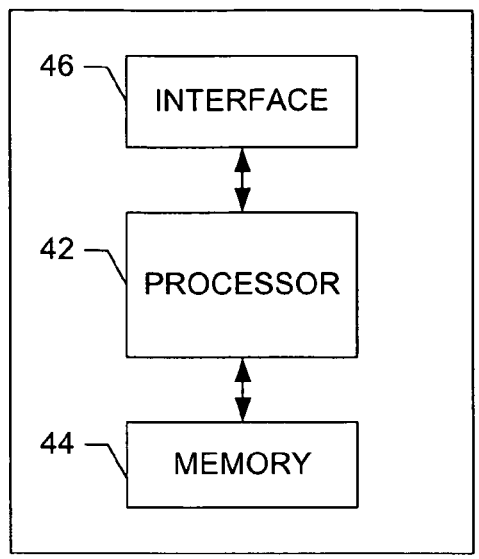
Figure 3:
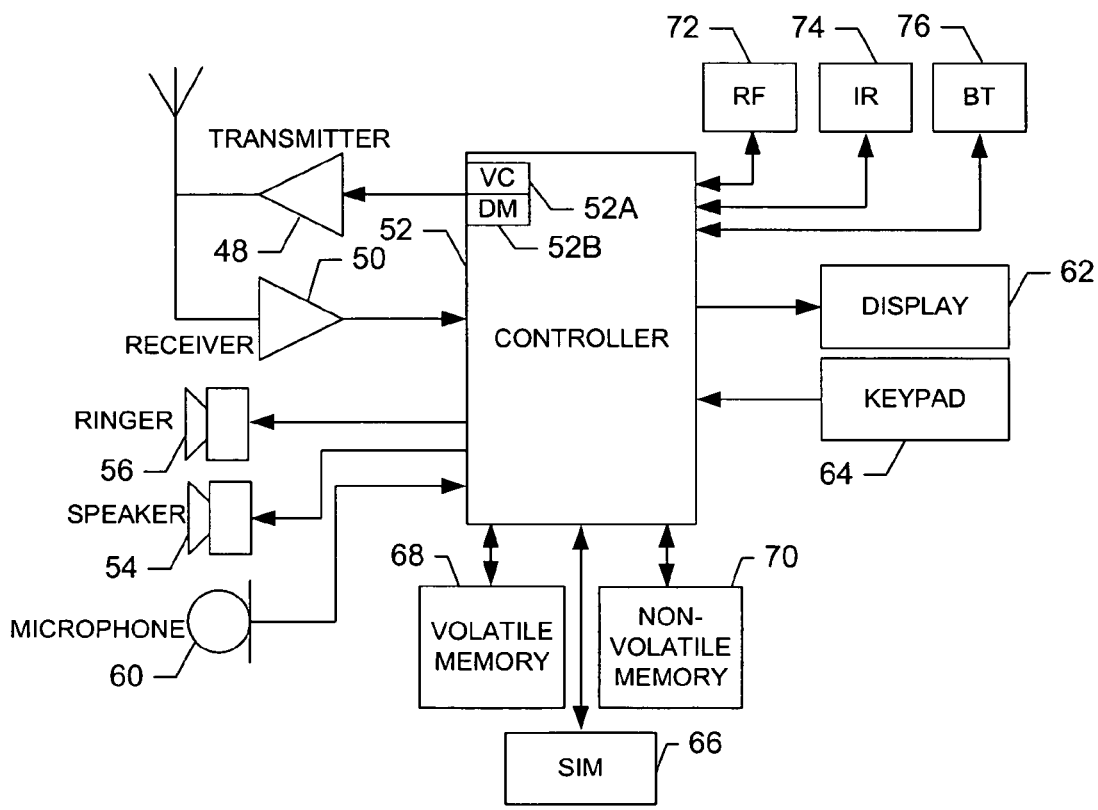
Figure 4A:
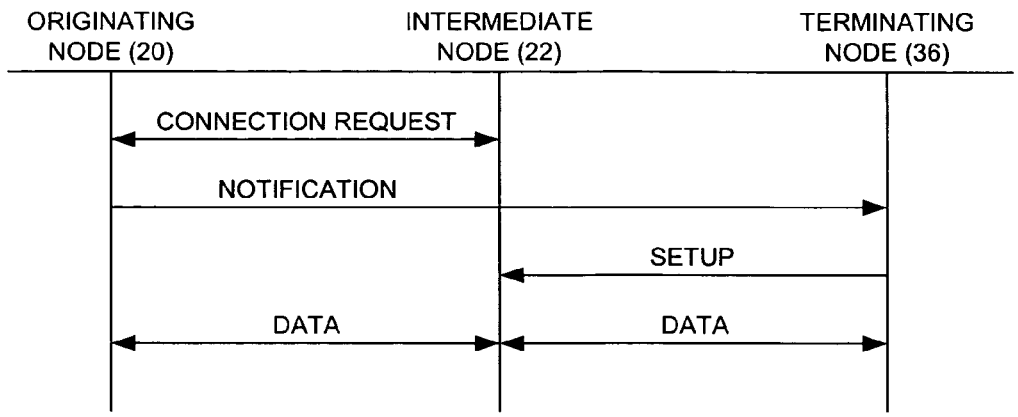
Figure 4B:
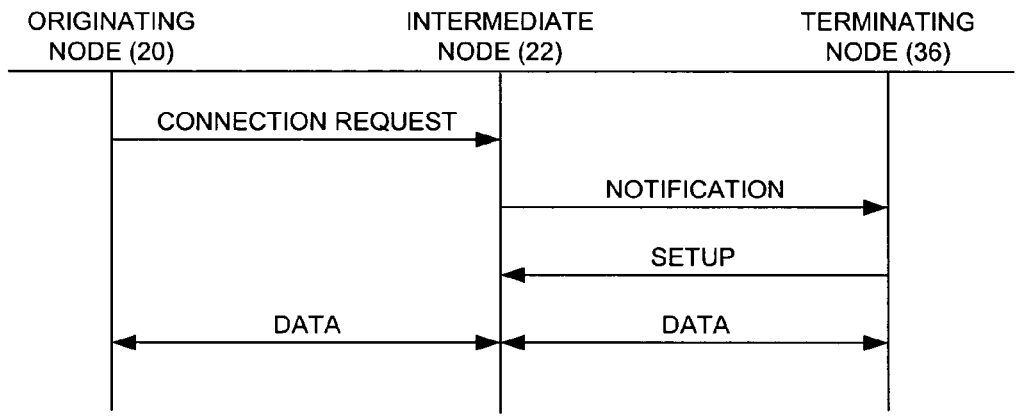
Figure 4C:
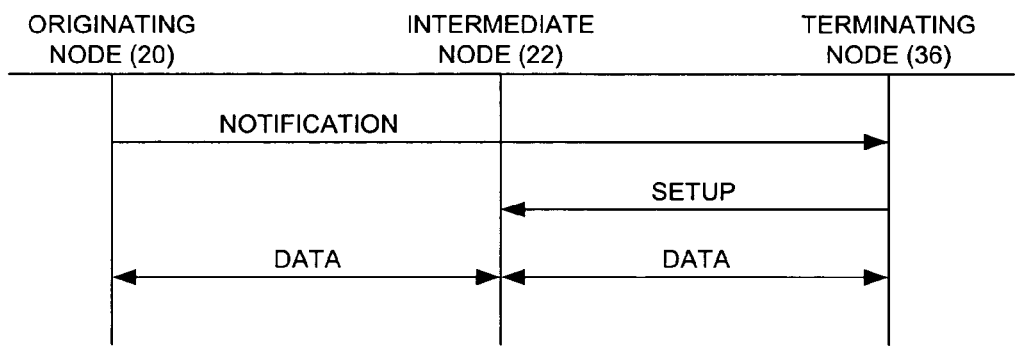
Figure 5A:
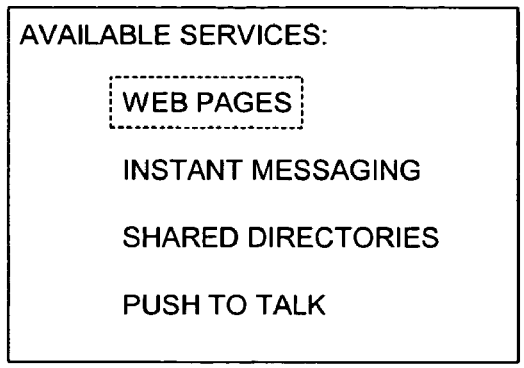
Figure 5B:
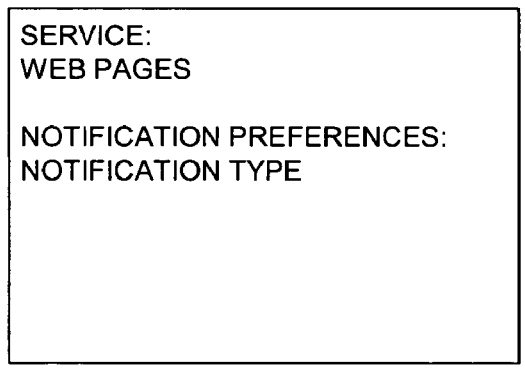
Figure 5C:
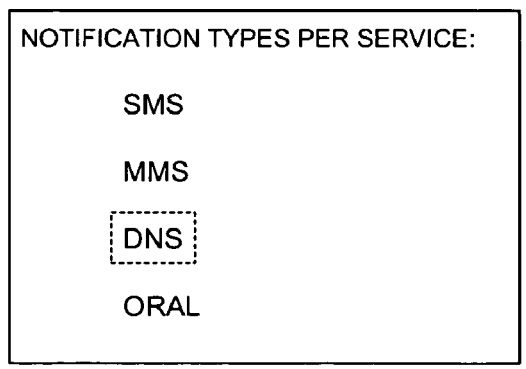
Figure 7:
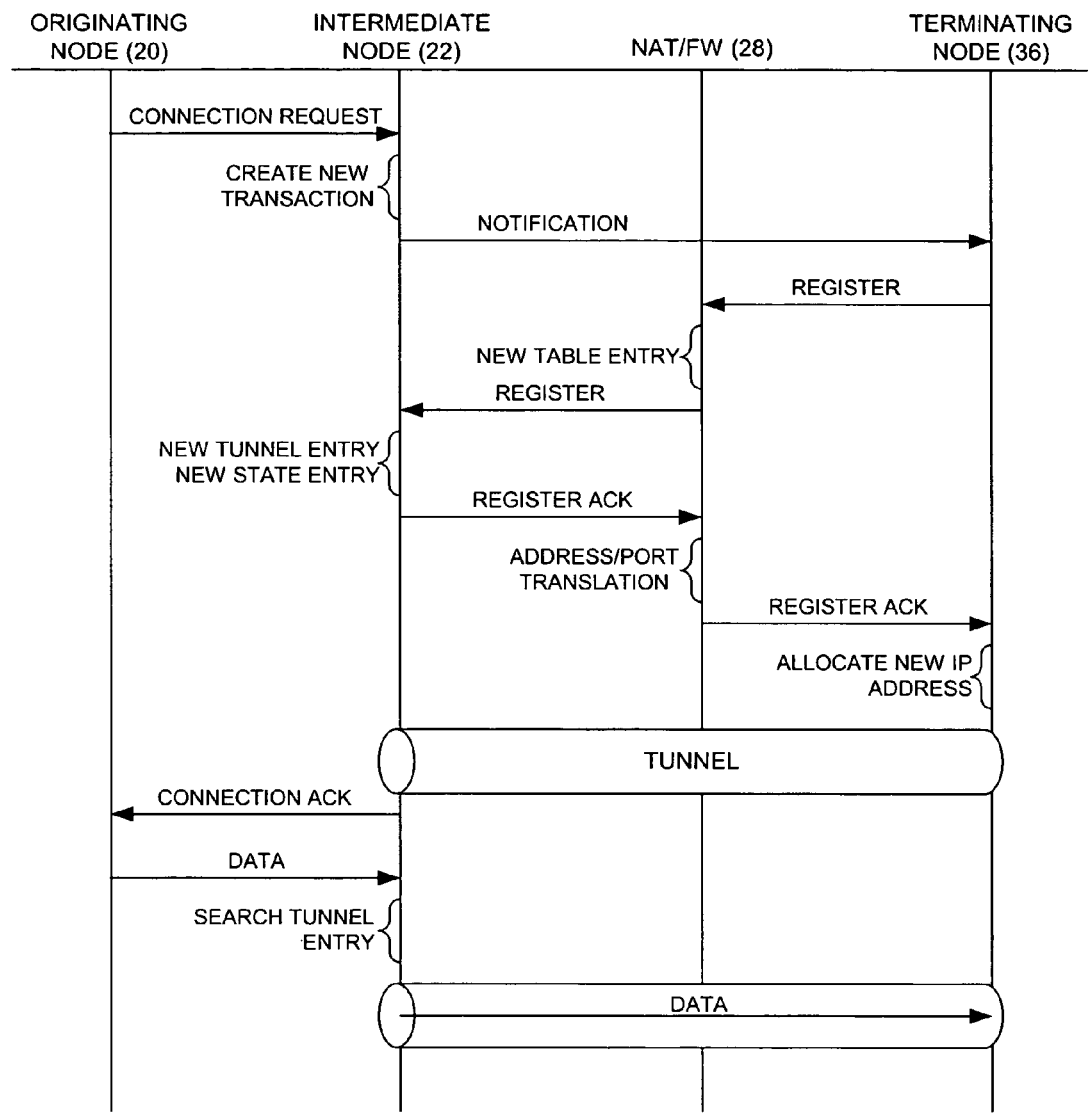
Figure 8:
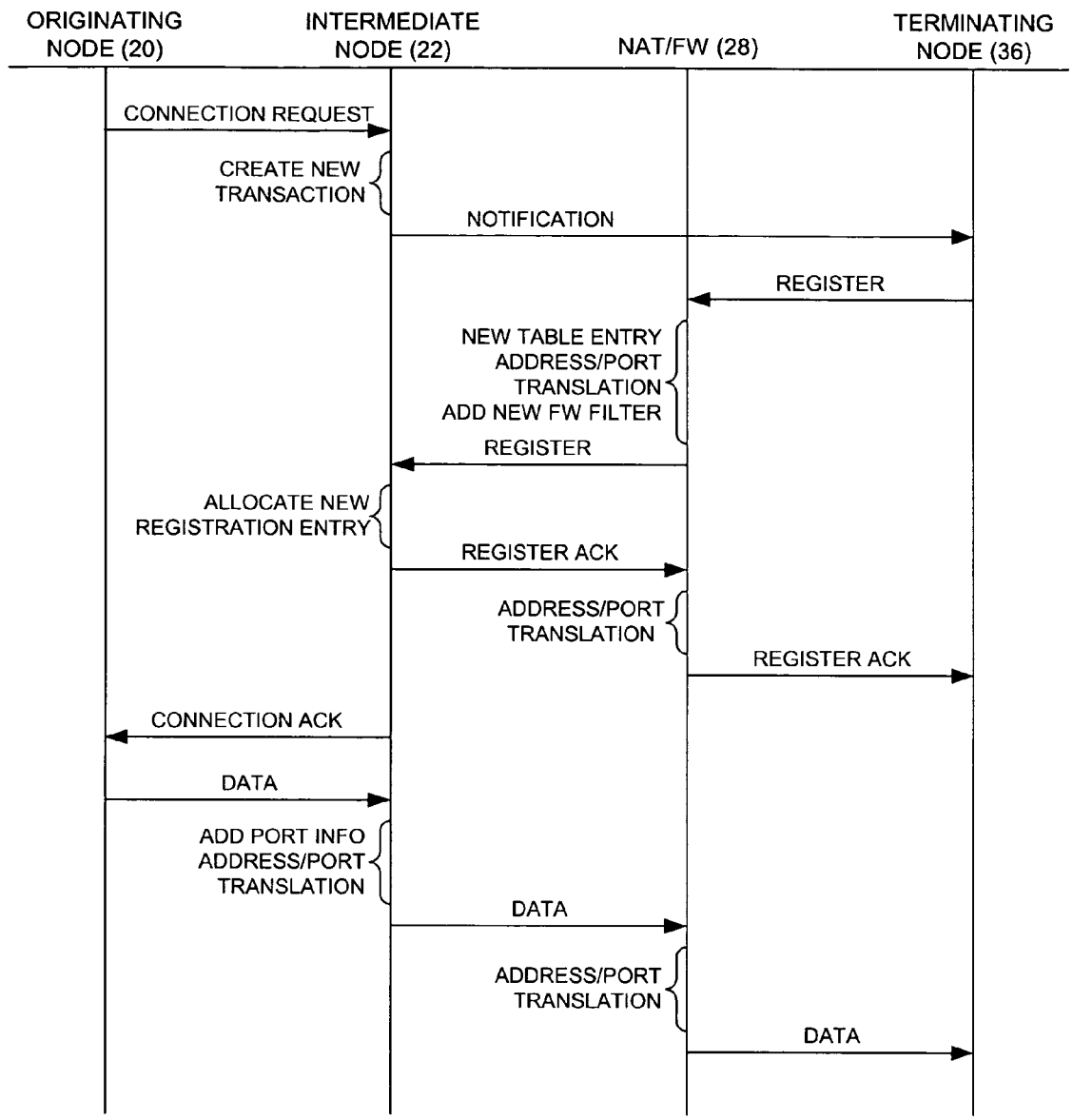

Having thus described the invention in general terms, reference will now be made to the accompanying drawings, which are not necessarily drawn to scale, and wherein:

FIG. 1 is a schematic block diagram of a communications system according to one embodiment of the present invention including at least one mobile network and at least one public and/or private network to which an originating node, an intermediate node and a terminating node are bi-directionally coupled directly or indirectly;

FIG. 2 is a schematic block diagram of an entity capable of operating as a network node, in accordance with embodiments of the present invention;

FIG. 3 is a schematic block diagram of a mobile station that may operate as a mobile terminal, according to embodiments of the present invention;

FIGS. 4A-4C are control flow diagrams briefly illustrating various embodiments of a method of communicating with a terminal;

FIGS. 5A-5C illustrate exemplar displays of a communication application capable of receiving a selection of one or more parameters from a user of an originating node;

FIGS. 6A-6C illustrate exemplar displays of a directory application capable of being operated from an originating node;

FIG. 7 is a control flow diagram more particularly illustrating a method of communicating with a terminal in accordance with one embodiment of the present invention; and FIG. 8 is a control flow diagram more particularly illustrating a method of communicating with a terminal in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of system that would benefit from the present invention is provided. The system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

As shown, the system 10 includes a public network 12, such as a public Internet Protocol (IP) network like the Internet. The public network includes a number of network nodes, each of which typically comprise a processing element such as a server computer, personal computer, laptop computer or the like. More particularly, the public network can include one or more network nodes comprising fixed terminals 14, each of which are capable of communicating within or across the public network. The network nodes of the public network 12 can also include a proxy 16, such as Session Initiation Protocol (SIP) proxy. As will be appreciated, the SIP proxy is capable of receiving and forwarding SIP signaling messages, such as SIP signaling messages to and/or from a network node comprising a fixed terminal operating as a SIP client.

In addition, the public network 12 can include one or more domain name system (DNS) servers 18. In this regard, each network node typically has a unique IP address that has an associated, typically easier to recall, host DNS name. The DNS servers, then, can be capable of transforming a host DNS name into the associated IP address such that network traffic can be routed to the appropriate network node. As described in greater detail below, any one or more of the network nodes, including any one or more fixed terminals, can operate as an originating node 20 to communicate with a terminating node across the public network. And to facilitate the originating node in communicating with the terminating node, the public network can further include one or more network nodes comprising an intermediate node 22, also described in greater detail below.

In addition to the public network 12, the system 10 includes one or more private networks 24, such as local area networks (LANs). Each private network, like the public network, can include a number of network nodes. Also, like the public network 12, the network nodes of each private network can include one or more DNS servers 26. Similar to before, the DNS servers of the private networks can be capable of transforming a host DNS name into an associated IP address such that network traffic can be routed to the appropriate public or network node. The private network can also include one or more network nodes comprising mobile terminals 32, each of which are capable of communicating within or across the private network. The terminals 32 can comprise, for example, mobile telephones, portable digital assistants (PDAs), pagers, laptop computers, smart cards and other types of electronic systems.

To facilitate the terminals 32 accessing the private network, the private network 24 can include one or more wireless access points (AP's) (not shown), each of which can be coupled to one or more terminals. In this regard, the AP's can comprise access points configured to communicate with the terminal in accordance techniques such as, for example, radio frequency (RF), Bluetooth (BT), infrared (IrDA) or any of a number of different wireless networking techniques, including wireless local area network (WLAN) or other techniques. Also, like the public network, the private network can include an originating node 20 and/or an intermediate node 22, both of which are described in greater detail below. As also described below, the private network can include a terminating node 36, which can be capable of communicating with an originating node via an intermediate node. And as also described below, one or more of the terminals of the private network can be capable of operating as an originating node or an intermediate node.

To facilitate communications between network nodes of the public network 12 and network nodes of the private networks 24, each private network can further include a Network Address Translator (NAT) interconnecting the public network and the private network. As explained above in the background section, each NAT can be capable of transforming a public IP address from the public network into a private IP address of a network node of a respective private network, and vice versa, for communications between the public network and the respective private network. As will be appreciated, the NAT can also include an application level gateway (ALG) (not shown) capable of transforming IP addresses embedded in, for example, application protocol data units (PDUs). In addition, the NAT include or be associated with a firewall and/or gateway for the respective private network. As shown, then, a NAT including or associated with a firewall/gateway is shown as a NAT/FW 28.

The system 10 can also include one or more mobile or cellular networks 30. The cellular networks can comprise one or more of a number of different mobile networks. In this regard, the cellular networks can comprise any of a number of first-generation (1G), second-generation (2G), 2.5G and/or third-generation (3G) cellular networks, and/or any of a number of other cellular networks capable of operating in accordance with embodiments of the present invention. For example, each cellular network can comprise a GSM (Global System for Mobile Communication), IS-136 (Time Domain Multiple Access—TDMA), IS-95 (Code Division Multiple Access—CDMA), or EDGE (Enhanced Data GSM Environment) network. Alternatively, one or more of the cellular networks can comprise GPRS (General Radio Packet Service) or GPRS-based (e.g., Universal Mobile Telecommunications System—UMTS) networks.

Like the public and private networks 12, 24, the cellular networks 30 also include one or more network nodes. In this regard, the network modes of each cellular network can include one or more mobile terminals 32 capable of communicating within and/or across a respective cellular network. And as described below, one or more of the mobile terminals are capable of operating as an originating node 20, such as in the same manner as the originating nodes of the public and private networks. In addition, as also described below, one or more of the mobile terminals are capable of operating as a terminating node 36 which, as indicated above and described below, can be capable of communicating with an originating node via an intermediate node 22.

Within the cellular networks 30, the network nodes can also include one or more network signaling support nodes such as one or more SGSNs (signaling GPRS support nodes) 38, and one or more gateway support nodes such as one or more GGSNs (gateway GPRS support nodes) 40. For example, the network nodes can include one or more SGSNs and one or more GGSNs, as such are described in a number of specifications of the 3G Partnership Project (3GPP). As will be appreciated by those skilled in the art, the SGSNs are capable of routing communications to and from the mobile terminals 32, and can also provide a connection to the other network nodes when the terminals are involved in a communication session with such network nodes. The GGSNs, on the other hand, are capable of interconnecting the cellular networks and the private networks 24. In this regard, the GGSNs are capable of performing traditional gateway actions, as such are well known. It should be noted that although the cellular networks can include SGSNs and GGSNs, the cellular networks can comprise other similarly operating network nodes for other types of cellular networks.

Reference is now made to FIG. 2, which illustrates a block diagram of an entity capable of operating as a network node (e.g., originating node 20, intermediate node 22, NAT/FW 28, terminating node 36, SGSN 38, GGSN 40, etc.) within the public network 12, private networks 24 or cellular networks 30, in accordance with one embodiment of the present invention. Although shown as separate entities, in some embodiments, one or more entities may support one or more of the network nodes, logically separated but co-located within the entit(ies). For example, a single entity may support a logically separate, but co-located, originating node (e.g., fixed terminal 14, proxy 16, DNS 18, mobile terminal 32, etc.) and intermediate node. Also, for example, as indicated above, a single entity may support a logically separate, but co-located NAT and firewall/gateway.

As shown, the entity capable of operating as a network node can generally include a controller 42, processor or the like connected to a memory 44. The controller can also be connected to at least one interface 46 or other means for transmitting and/or receiving data, content or the like. The memory can comprise volatile and/or non-volatile memory, and typically stores content, data or the like. For example, the memory typically stores software applications, instructions or the like for the controller to perform steps associated with operation of the entity in accordance with embodiments of the present invention. Also, for example, the memory typically stores content transmitted from, or received by, the network node.

FIG. 3 illustrates a functional diagram of a mobile station that may operate as a mobile terminal 32 and, as such, an originating node 20 or terminating node 36, according to embodiments of the invention. It should be understood, that the mobile station illustrated and hereinafter described is merely illustrative of one type of mobile terminal that would benefit from the present invention and, therefore, should not be taken to limit the scope of the present invention. While several embodiments of the mobile station are illustrated and will be hereinafter described for purposes of example, other types of mobile terminals, such as portable digital assistants (PDAs), pagers, laptop computers and other types of voice and text communications systems, can readily employ the present invention.

The mobile station includes a transmitter 48, a receiver 50, and a controller 52 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of 1G, 2G, 2.5G and/or 3G communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 52 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 52A, and may include an internal data modem (DM) 52B. Further, the controller may include the functionally to operate one or more software applications, which may be stored in memory.

The mobile station also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 66, a removable user identity module (R-UIM) or the like, which typically stores information elements related to a mobile subscriber. In addition to the SIM, the mobile station can include other memory. In this regard, the mobile station can include volatile memory 68, as well as other non-volatile memory 70, which can be embedded and/or may be removable. For example, the other non-volatile memory can comprise embedded or removable multimedia memory cards (MMCs), Memory Sticks manufactured by Sony Corporation, EEPROM, flash memory, hard disk or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code or the like, capable of uniquely identifying the mobile station. The memories can also store content, such as that to transmit to, or that received from, an originating node 20.

The mobile station can also include one or more means for sharing and/or obtaining data from electronic devices, such as other network nodes, in accordance with any of a number of different wireline and/or wireless techniques. For example, the mobile station can include a radio frequency (RF) transceiver 72 and/or an infrared (IR) transceiver 74 such that the mobile station can share and/or obtain data in accordance with radio frequency and/or infrared techniques. Also, for example, the mobile station can include a Bluetooth (BT) transceiver 76 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including local area network (LAN) and/or wireless LAN (WLAN) and/or other wireless techniques.

As indicated in the background section, conventional techniques for permitting an IP device, such as an originating node 20, to initiate an IP connection with a terminating node 36, such as a mobile terminal, ignore the limitations of the public domains like the public network 12 (e.g., Internet) that lead to the use of the NAP/FW 28 to interconnect the public network to a respective private network 24. Namely, such techniques ignore the limitation of available public IP addresses. Also, such techniques ignore the ability of the NAP/FW to provide firewall and/or gateway functionality to a respective private network. Thus, embodiments of the present invention provide an improved system and method for communicating with a terminating node, where the terminating node resides in a cellular or otherwise mobile network. More particularly, embodiments of the present invention provide a system and method that permit originating nodes to initiate an IP connection with terminating nodes while accounting for the limited address space of public domains. In addition, the system and method can, but need not, permit originating nodes to initiate an IP connection with terminating nodes while maintaining firewall and/or gateway functionality to the mobile network. As described below, the originating node initiates communication with a terminating node comprising a terminal within a cellular network 30. It should be understood, however, that the terminating node can alternatively comprise a network node of a private network, without departing from the spirit and scope of the present invention.

As indicated above, the system 10 can include an originating node 20, an intermediate node 22 and a terminating node 36. Generally, an originating node is capable of requesting communication with a terminating node, and operating as a peer node of a data exchange session. The originating node can also be capable of generating and thereafter sending a notification, such as an IP-based or non-IP-based notification, to the terminating node. Additionally, or alternatively, the originating node can be capable of triggering another network node to generate and send such a notification to the terminating node. In this regard, the originating node can be capable of identifying the terminating node to thereby deliver, or trigger another network node to deliver, such a notification.

The terminating node can be capable of operating as another peer node of a data exchange session. In this regard, the terminating node 36 is generally capable of receiving a notification of incoming data, such as from the originating node 20 or the intermediate node 22. Additionally, the terminating node can be capable of operating as a tunnel end-point of a data exchange session.

The intermediate node 22 can generally be capable of operating as a tunnel end-point with the terminating node 36 during a data exchange session between the originating node 20 and the terminating node, while allocating a public IP address to the terminating node. As suggested above, the intermediate node may also be capable of generating and delivering a notification, such as an IP-based or non-IP-based notification, to the terminating node. Like the originating node, then, when the intermediate node operates as a tunnel end-point, the intermediate node can be capable of identifying the terminating node to thereby deliver such a notification. It should be appreciated, however, that the intermediate node need not generate or deliver a notification to the terminating node, such as in instances in which the terminating node has existing IP connectivity.

Advantageously, the intermediate node 22 can additionally or alternatively be capable of operating as a proxy between the originating node 20 and the terminating node 36 during a data exchange session. In such instances, the intermediate node can function to forward data between the originating node and the terminating node. As the intermediate node forwards data, then, the intermediate node can process the data and, based upon a connection state, initiate transformation of public and private IP addresses and ports between the originating node and the terminating node.

In accordance with embodiments of the present invention, a method of communicating with a terminating node 36 generally includes initiating communication with the terminating node. Initiating communication with the terminating node, in turn, can include one or more of three phases: connection request, notification and setup. As shown in FIGS. 4A-4C, the connection request phase can include the originating node 20 sending a connection request, such as an IP-based or non-IP-based connection request, directly or indirectly to an intermediate node 22 supporting the terminating node 36. For example, the originating node can send an IP connection request directly to the intermediate node. Alternatively, for example, the originating node can send a DNS query to a DNS server 18 to thereby trigger the DNS server to generate and send a connection request to the intermediate node directly or via one or more other DNS servers, in contrast to operation of conventional DNS servers. In this regard, in instances in which a DNS server communicates with the intermediate node, the DNS server and intermediate node can have a trust relationship.

Irrespective of how the intermediate node 22 receives the connection request, the intermediate node can send the identity of the terminating node 36 to the originating node 20 in response to the connection request, as shown in FIG. 4A. Thereafter, the originating node can enter the notification phase of initiating communication with the terminating node based upon the identity of the terminating node. Alternatively, in response to the connection request, the intermediate node can enter the notification phase independent of the originating node, as shown in FIG. 4B. In yet another alternative, the originating node has the identity of the terminating node. In such instances, the originating node need not send a connection request to the intermediate node. Thus, the originating node can enter the notification phase of initiating communication with the terminating node based upon the identity of the terminating node, without first performing the connection request phase, as shown in FIG. 4C.

As will be appreciated, the manner in which the originating node 20 and intermediate node 22 communicate with one another and/or the terminating node 36 to initiate communication with the terminating node in accordance with the connection request, notification and setup phases can be selected in any of a number of different manners. For example, the manner in which the originating node and intermediate node communicate with one another and/or the terminating node can be selected based upon one or more parameters for communication with the intermediate node and/or the terminating node. More particularly, for example, the originating node can select, or the intermediate node or terminating node can select for the originating node, to directly or indirectly (via the intermediate node) initiate communication with the terminating node based upon one or more security associations (SA's). The SA's, in turn, can exist between the originating node and one or more of the intermediate node and the terminating node, and/or between the intermediate node and the terminating node.

Additionally, or alternatively, the originating node can select (or the intermediate node/terminating node can select for the originating node) to directly or indirectly initiate communication with the terminating node based upon parameter(s) comprising one or more preferences of a user of the originating node, intermediate node and/or terminating node. For example, as shown in FIG. 5A, a user of the originating node 20 can be capable of selecting one or more services (e.g., "Web pages, instant messaging," "shared directories," "push to talk,") the originating node is capable of utilizing to communicate with the terminating node 36. The user can select a service (e.g., "Web pages"), and thereafter be presented with notification preferences (e.g., "notification type") with respect to the selected service, as shown in FIG. 5B.

The user of the originating node 20 can then be presented with list of different notification types (e.g., "SMS", "MMS," "DNS," "oral") available for the selected service, as shown in FIG. 5C. As will be appreciated, each notification type can be associated with one or more identifiers of a terminating node or user of a terminating node. In this regard, such identifiers may be found, for example, in a directory application capable of presenting names (e.g., "Severi Virtanen," "Kari Vitikainen," "Steven Watkins"—FIG. 6A) of a number of contacts, as well as associated identifiers such as telephone numbers (e.g., "555-555-5555"—FIG. 5B) and/or DNS host names (e.g., "Severi.Virtanen.myphone.net"—FIG. 5C). The originating node user can thereafter select a notification type (e.g., "DNS" for the selected service (e.g., "Web pages"). In this manner, the originating node user can set parameters as to the notification technique for different services over which the originating node is capable of communicating with the terminating node. It should be understood, however, that the foregoing example is merely one technique by which parameter(s) can be selected for initiating communication with the terminating node. As such, communication can be initiated with the terminating node based upon parameter(s) any of a number of preferences of a user of any one or more of the originating node, intermediate node and/or terminating node.

Irrespective of which network node enters the notification phase of initiating communication with the terminating node 36, once within the notification phase, the terminating node can be notified of incoming data, such as by an IP-based or non-IP-based notification. For example, the terminating node can be notified of incoming data in accordance with non-IP-based notification techniques such as oral communication, text messaging, radio frequency (RF) communication, short messaging service (SMS) communication, multimedia messaging service (MMS) communication, instant messaging or the like. Also, for example, the terminating node can be notified of incoming data in accordance with other techniques such as Bluetooth and/or any of a number of different wireline or wireless communication techniques, including LAN and/or WLAN and/or other wireless techniques.

The terminating node 36 can generally receive such a notification directly or indirectly from the originating node 20 (see FIGS. 4A and 4C) or the intermediate node 22 (see FIG.

4B), typically in accordance with the connection request phase. For example, a mobile terminal 32 or a fixed terminal 14 (i.e., mobile or fixed terminal operating as an originating node) or intermediate node can generate a notification, and thereafter send the notification directly to the terminating node based upon the identity of the terminating node. Alternatively, for example, an originating node or intermediate node comprising a SIP client can communicate with a SIP proxy 16 to thereby trigger the SIP proxy to generate and send a notification to the terminating node. In another alternative, for example, an originating node or intermediate node can communicate with another network node, such as another network node of the public network 12, to thereby trigger the other network node to generate and send a notification to the terminating node.

In the above examples of sending a notification to the terminating node 36, the originating node 20 or intermediate node 22 can send a notification of incoming data to the terminating node independent of a respective private network 24 of the terminating node. It should be appreciated, however, that the terminating node can be notified of incoming data in a manner dependent upon the respective private network. For example, a fixed terminal 14 can communicate with another network node of the private network to thereby trigger the other network node to generate and send a notification to the terminating node. More particularly, for example, the originating node or intermediate node can communicate with the NAT/FW 28 of the respective private network to thereby trigger the NAT/FW to generate and send a notification to the terminating node. In yet another alternative, for example, the originating node can communicate with a DNS server 18 which, in turn, communicates with the NAT/FW directly or via one or more other DNS servers. In response, the NAT/FW can communicate with a respective GGSN 40 to thereby trigger the GGSN to notify the terminating node of incoming data, such as in accordance with a network-initiated connection setup technique.

Irrespective of how the terminating node 36 is notified of incoming data, once the terminating node is notified, the terminating node can register itself with the intermediate node 22 supporting the terminating node. Alternatively, the terminating node can register with an intermediate node other than the supporting intermediate node. In such instances, or more generally in instances in which the terminating node and intermediate node do not otherwise have a security association, the terminating node can receive parameters, such as an IP address of the other intermediate node and/or any required authentication parameters (e.g., authentication token), as the terminating node is notified of incoming data to thereby permit the terminating node to register with the other intermediate node. In this regard, even in instances where the terminating node registers with the supporting intermediate node, the terminating node can receive authentication parameters as the terminating node is notified of incoming data, particularly in instances in which the terminating node does not have a preexisting trust relationship with the supporting intermediate node.

The terminating node 36 can register with the intermediate node 22 in any of a number of different manners. In one advantageous embodiment, for example, the terminating node registers with the intermediate node such that the intermediate node assigns a public IP address to the terminating node, such as from an available pool of public IP addresses available to the intermediate node. In addition to assigning a public IP address to the terminating node, the terminating node of this embodiment can set up a communication tunnel between the intermediate node and the terminating node. In this regard, as will be appreciated by those skilled in the art, tunneling is a technique whereby the intermediate node and the terminating node can communicate across the public and private networks 12, 24 in such a way that routing nodes of the respective networks are unaware that such communication crosses into the private network. As such, the originating node 20 can subsequently communicate with the terminating node through the intermediate node in a manner that avoids requiring transformation of public/private IP addresses by the NAT/FW 28, including the ALG of the NAT/FW.

In addition to avoiding transformation of IP addresses by the NAT/FW 28, with the terminating node 36 registering with the intermediate node 22 in the manner described above, the same tunnel between the intermediate node and terminating node can be utilized for multiple connections between multiple originating nodes 20 and the terminating node. Thus, multiple connections to the terminating node do not require extra signaling over an otherwise rather band-limited air interface, and do not require network resources of the NAT/FW. Also, the terminating node can have a permanent or semi-permanent virtual presence in the public network 12 via the intermediate node.

In lieu of registering with the intermediate node 22 such that the intermediate node assigns a public IP address to the terminating node 36 and sets up a communication tunnel with the terminating node, the terminating node can register with the intermediate node in a number of other manners. In another embodiment, for example, the terminating node can register with the intermediate node such that the intermediate node operates as a proxy for communications between the originating node 20 and the terminating node. In contrast to the previous example, in this embodiment, the intermediate node receives communications from the originating node or the terminating node, and forwards such communications to the other of the originating node and the terminating node.

As will be appreciated, by registering with the intermediate node 22 such that the intermediate node operates as a proxy for communications between the originating node 20 and the terminating node 36, the intermediate node need not have an available pool of public IP addresses capable of being assigned to the terminating node, as in the previous embodiment. Also, communications can be passed to and from the terminating node without extra overhead to the over the air interface between the cellular network 30 and the private network 24, and without requiring extra resources at the terminating node.

Irrespective of how the terminating node 36 registers with the intermediate node 22, the originating node 20 and terminating node can communicate after the terminating node has registered with the intermediate node. When the intermediate node assigns a public IP address to the terminating node and sets up a tunnel with the terminating node, for example, the originating node can send data to the intermediate node based upon the public IP address of the terminating node assigned by the intermediate node. In turn, the intermediate node can encapsulate the data, and send the encapsulated data to the terminating node through the tunnel between the intermediate node and the terminating node. Alternatively, when the intermediate node operates as a proxy for communications between the originating node and terminating node, for example, the originating node can send data to the intermediate node based upon a public IP address of the intermediate node. The intermediate node can process the data and, based upon a connection state, initiate transformation of public and private IP addresses and ports between the originating node and the terminating node. Thereafter, the intermediate node can forward the data to the terminating node.

Reference is now made to FIGS. 5 and 6, which illustrate examples of an originating node 20 initiating communication, and thereafter communicating, with a terminating node 36 via an intermediate node 22, in accordance with embodiments of the present invention. For purposes of the example shown in FIGS. 5 and 6, consider an originating node 20 having the public IP address: "192.31.10.1." Also, for example, consider an intermediate node 22 having the public IP address: "192.21.200.1" and, in the example shown in FIG. 7, being capable of assigning one or more IP addresses to one or more supported terminating nodes from the pool of IP addresses "192.21.200.2-192.21.200.102.". In addition, consider a NAT/FW 28 being capable of assigning one or more IP addresses within a pool of one or more IP addresses, e.g., "192.21.200.123-192.21.200.223." Further, consider a terminating node that has the private IP address: "10.11.12.13," and is capable of being identified by the host DNS name "terminal_name."

Consistent with FIG. 4B, as shown in FIG. 7, the originating node 20 can send a CONNECTION REQUEST message to the intermediate node 22, such as via a DNS server 18 in response to a DNS QUERY from the originating node. In this regard, the CONNECTION REQUEST message can identify the terminating node 36 by the host DNS name "terminal_name," such as in one or more header fields or a payload. Thereafter, the intermediate node can enter the notification phase by creating or otherwise initiating a new transaction for the originating node and terminating node, where the transaction includes the public IP address of the originating node ("192.31.10.1"), identified as the source, and includes the host DNS name ("terminal_name") of the terminating node, identified as the destination. Thereafter, presuming the terminating node has not previously registered with the intermediate node, the intermediate node can send a NOTIFICATION message, directly or indirectly, to the terminating node. For example, the intermediate node can send a NOTIFICATION message to the terminating node, where the NOTIFICATION message comprises a SMS message, MMS message, or the like. Irrespective of the form of the NOTIFICATION message, however, the terminating node can enter the set up phase of initiating communication by registering with the intermediate node in response to the NOTIFICATION message.

As shown in FIG. 8, the terminating node 36 can register with the intermediate node 22 by first sending a REGISTER message to the intermediate node via a respective NAT/FW 28, where the REGISTER message can identify the private IP address of the terminating node ("10.11.12.13") and a first open communication port (e.g., "10123"), such as a first user datagram protocol (UDP) port or a transmission control protocol (TCP) port, as the source of the REGISTER message. The REGISTER message can also identify the public IP address of the intermediate node ("192.21.200.1") and the first open communication port ("10123") as the destination of the REGISTER message. In addition, the REGISTER message can include a parameter identifying the host DNS name (i.e., "terminal_name") of the terminating node.

In response to the REGISTER message, the NAT/FW 28 can create a new transformation table entry for the terminating node 36 by associating the private IP address of the terminating node ("10.11.12.13") with a public IP address (e.g., "192.21.200.123") and a second open communication port (e.g., "32456"). In addition to creating a new transformation table entry, to permit communications between the intermediate node 22 and the NAT/FW, the NAT/FW can also add a new firewall (FW) filter allowing communications from the NAT/FW via the second open communication port and communications to the intermediate node via the first open communication port. It should be noted that before attempting to identify an open UDP/TCP port, the terminating node can attempt IP-in-IP tunneling if the NAT/FW can allocate a single public IP address to each supported network node of the private network 24 and cellular network 30, and if the NAT/FW does not perform port translation and the firewall functionality allows traffic to flow in accordance with IP-in-IP.

After creating a new transformation table entry, the NAT/FW 28 can thereafter transform the private IP address and port ("10.11.12.13, 10123") in the REGISTER message from the terminating node 36 into the public IP address and port ("192.21.200.123, 32456") assigned to the terminating node by the NAT/FW. After transforming the address and port of the register message, the NAT/FW can pass the transformed REGISTER message to the intermediate node 22 for registration. Upon receiving the transformed register message, then, the intermediate node can create a new tunnel entry for the terminating node. In this regard, the tunnel entry can include, for example, the public IP address of the intermediate node ("192.21.200.1") and the first open communication port ("10123") as the local address/port for establishing a tunnel, and the public IP address of the terminating node ("192.21.200.123") and the second open communication port ("32456") assigned by the NAT/FW as the remote address/port for establishing the tunnel.

The intermediate node 22 can also assign a public IP address (e.g., "192.21.200.2") to the terminating node 36 from the pool of IP addresses available to the intermediate node ("192.21.200.2-192.21.200.102"). For the tunnel entry, then, the intermediate node can create a state entry that includes the public IP address of the originating node ("192.31.10.1"), and the public IP address assigned to the terminating node ("192.21.200.2") by the intermediate node. In various instances, the intermediate node can also add an entry to the DNS server 18, or send an update message to the DNS server, associating the host DNS name of the terminating node ("terminal_name") with the public IP address assigned to the terminating node ("192.21.200.2"). Further, the intermediate node can begin a "time-to-live" counter for the public IP address assignment such that the public IP address is not indefinitely associated with the terminating node, as such will be appreciated by those skilled in the art.

Then, after creating the tunnel and state entries, and after assigning the public IP address to the terminating node 36, the intermediate node 22 can send a register acknowledgement ("REGISTER ACK") message back to the terminating node. In this regard, the REGISTER ACK message can identify the public IP address of the terminating node and the second port ("192.21.200.123, 32456") assigned by the NAT/FW 28 as the destination, and identify the public IP address of the intermediate node and the first communication port ("192.21.200.1, 10123") (also identified in the register message from the terminating node). The REGISTER ACK message can also include the parameter identifying the host DNS name (i.e., "terminal_name") of the terminating node. In addition, the REGISTER ACK message can identify, such as in a payload, the public IP address assigned by the intermediate node to the terminating node ("192.21.200.2").

The REGISTER ACK message can pass from the intermediate node 22 in the public network 12 to the NAT/FW 28 in a respective private network 24. The NAT/FW, then, can receive the REGISTER ACK message and, based upon the transformation table entry previously created for the terminating node, transform the destination of the REGISTER ACK message to identify the private IP address of the terminating node 36 and the first open communication port ("10.11.12.13, 10123") (like the source of the register message). The NAT/FW can then forward the transformed REGISTER ACK message to the terminating node. Then, upon receipt of the transformed REGISTER ACK message, the terminating node can allocate the public IP address assigned by the intermediate node to incoming data to the terminating node. Also upon receipt of the transformed register acknowledgement, the tunnel between the intermediate node and the terminating node can be established for tunneling communications between the intermediate node and the terminating node, as such is well known to those skilled in the art.

Once the tunnel is established between the intermediate node 22 and the terminating node 36, and the terminating node has allocated the public IP address assigned by the intermediate node, the intermediate node can send a connection acknowledgement ("CONNECTION ACK") message to the originating node 20. The CONNECTION ACK message can be sent to the originating node in a number of different manners. For example, the CONNECTION ACK message can be sent to the originating node via the same path that the originating node sent the connection request to the intermediate node, or via a different path. Alternatively, in instances in which the terminating node had previously registered with the intermediate node, the intermediate node can send a CONNECTION ACK message to the originating node when the intermediate node received the connection request from the originating node. Irrespective of when the intermediate node sends the CONNECTION ACK message, however, the CONNECTION ACK message can identify the public IP address of the originating node ("192.31.10.1") and a third open communication port (e.g., "5060") as the destination, and the public IP address of the intermediate node ("192.21.200.2") assigned to the terminating node and the third communication port as the source. The CONNECTION ACK can also identify, such as in a header field or a payload, the public IP address assigned to the terminating node ("192.21.200.2") by the intermediate node.

After receiving the CONNECTION ACK message, the originating node 20 can send DATA to the terminating node 36 via the tunnel between the intermediate node 22 and the terminating node utilizing the public IP address assigned to the terminating node by the intermediate node. More particularly, the originating node can send DATA to the intermediate node by addressing the destination of the DATA to the public IP address of the terminating node assigned by the intermediate address and the third communication port ("192.21.200.2, 5060"). In addition, the data can identify the IP address of the originating node and the third communication port ("192.31.10.1, 5060") as the source. As will be appreciated, the originating node, as well as any other source of messages, data or the like, can encrypt the DATA for subsequent decryption by the destination of such messages, data or the like.

Upon receipt of the DATA from the originating node, the intermediate node can retrieve the tunnel entry created for the terminating node based upon any one or more of the contents of the tunnel entry, such as IP address of the originating node (i.e., source), the public IP address of the terminating node (i.e., destination) assigned by the NAT/FW, the public IP address of the terminating node assigned by the intermediate node, or the like. The intermediate node can thereafter encapsulate the DATA, such as into new IP+UDP/TCP DATA, and pass the encapsulated DATA through the tunnel from the intermediate node to the terminating node, as shown in FIG. 8. Upon receipt of the encapsulated DATA, the terminating node, or more particularly an IP tunnel interface of the terminating node, can de-encapsulate the DATA for subsequent use by the terminating node.

Reference is now made to FIG. 8, which illustrates a method of communicating between an originating node 20 and a terminating node 36 via an intermediate node 22 in accordance with another embodiment, where the originating node initiates communication. Like the method shown and described in conjunction with FIG. 7, and consistent with FIG. 4B, the method of communicating with a terminating node can include the originating node sending a CONNECTION REQUEST message to the intermediate node, such as via a DNS server 18, where the CONNECTION REQUEST message identifies the terminating node by its DNS host name ("terminal_name"). Also similar to that described above with respect to FIG. 8, the intermediate node can enter the notification phase by creating or otherwise initiating a new transaction for the originating node and terminating node, and sending a NOTIFICATION message, directly or indirectly, to the terminating node. Then, in response to the NOTIFICATION message, the terminating node can enter the set up phase of initiating communication by registering with the intermediate node.

As shown in FIG. 8, the terminating node 36 can register with the intermediate node 22 by first sending a REGISTER message to the intermediate node via a respective NAT/FW 28 where, like with the embodiment of FIG. 7, the REGISTER message can identify the private IP address of the terminating node ("10.11.12.12") and the first open communication port ("10123") as the source, and can include the public IP address of the intermediate node ("192.21.200.1") and the first open communication port as the destination. In addition, the REGISTER message can include a parameter identifying the host DNS name (i.e., "terminal_name") of the terminating node. In response to the REGISTER message, as before, the NAT/FW can create a new transformation table entry for the terminating node to associate the private IP address of the terminating node ("10.11.12.13") with a public IP address (e.g., "192.21.200.123") and a second open communication port (e.g., "32456"). The NAT/FW can also, as before, add a new firewall (FW) filter allowing communications from the NAT/FW via the second open communication port and communications to the intermediate node via the first open communication port. Thereafter, the NAT/FW can transform the private IP address and port in the header fields of the register message from the terminating node into the public IP address and port assigned to the terminating node.

After transforming the address and port of the REGISTER message from the terminating node 36, the NAT/FW 28 can pass the transformed REGISTER message to the intermediate node 22 for registration. In accordance with the embodiment shown in FIG. 8, the intermediate node can then allocate a new registration entry for the terminating node based upon the transaction previously created by the intermediate node and the registration message. Also, as will be appreciated, the intermediate node can designate that an open communication port with the originating node be defined upon receipt of the first data packet from the originating node. In this regard, the registration entry can include, for example, the host DNS name of the terminating node ("terminal_name"), the public IP address of the originating node as a public IP address ("192.31.10.1"), and the public IP address of the NAT/FW ("192.21.200.123") and the second open communication port ("32456") as a private address/port.

After creating the new registration entry, the intermediate node 22 can send a REGISTER ACK message back to the terminating node 36, as before. As shown in the previous example, and in contrast to the register acknowledgment described with respect to FIG. 7, however, the register acknowledgement of this embodiment typically does not include a payload including a public IP address assigned to the terminating node by the intermediate node. The REGISTER ACK message can pass from the intermediate node in the public network 12 to the NAT/FW 28 in a respective private network 24. The NAT/FW, as before, can receive the REGISTER ACK message. Based upon the transformation table entry previously created for the terminating node, then, the NAT/FW can transform the destination of the REGISTER ACK message to identify the private IP address of the terminating node and the first open communication port ("10.11.12.13, 10123") (like the source of the register message).

After the intermediate node 22 has created the registration entry for the terminating node 36, or after the intermediate node has sent the REGISTER ACK message to the terminating node, the intermediate node can send a CONNECTION ACK message to the originating node 20, as before. In the CONNECTION ACK message, the intermediate node can identify the public IP address of the originating node ("192.31.10.1") as the destination. The CONNECTION ACK message can also identify a public IP address (e.g., "192.21.200.2") from the pool of one or more IP addresses available to the intermediate node, where the public IP address is associated with communications designated for a terminating node.

After receiving the CONNECTION ACK message, the originating node 20 can send DATA to the terminating node 36 via the intermediate node 22 (operating as a proxy in FIG. 8). More particularly, the originating node can send DATA to the intermediate node by identifying the public IP address of the originating node ("192.31.10.1") and a third open communication port (e.g., "5060") as the source. In addition, the DATA can identify the public IP address of the intermediate node ("192.21.200.2") that is associated with communications designated for a terminating node, and the third communication port, as the destination. As will be appreciated, as indicated above, the originating node, as well as any other source of messages, data or the like, can encrypt the DATA for subsequent decryption by the destination of such messages, data or the like.

Upon receipt of the first packet of DATA from the originating node, the intermediate node can update the registration entry for the terminating node to include the third port designated by the originating source. Thereafter, for the first and subsequent packets of data from the originating node 20, the intermediate node 22 can forward the DATA to the terminating node via the NAT/FW, such as by forwarding the DATA to the public IP address of the terminating node ("192.21.200.123") and the second communication port ("32456") assigned by the NAT/FW 28. In this regard, the intermediate node can identify the public IP address of the intermediate node ("192.21.200.1") and the first communication port ("10123") as the source of the DATA. The NAT/FW can then receive the DATA, and transform the public IP address assigned to the terminating node 36 by the NAT/FW into the private IP address of the terminating node ("10.11.12.13"). After transforming the data packet, the NAT/FW can forward the DATA packets to the terminating node for subsequent use by the terminating node.

As will be appreciated, in various instances, the network nodes may require a security association with other network nodes to thereby accept communications from those other network nodes. In such instances, the network node sending data, messages or the like may be required to include authentication parameters, such as an authentication token, such that the recipient of such data, messages or the like can authenticate the origin of the same. For example, the originating node 20 can include authentication parameters in data sent to the terminating node 36. Also, for example, the intermediate node 22 can include authentication parameters in messages sent to the terminating node. If a network node desiring to send data, messages or the like does not have a security association with the desired recipient, however, the network node can communicate with a network entity capable of providing the authentication parameters before sending the data, messages or the like. For example, during the connection request phase of initiating communication, presume the originating node does not have a security association with the terminating node. In such an instance, the intermediate node can establish a security association between the originating node and terminating node during the connection request phase (see, e.g., FIG. 4A), and send associated authentication parameters to the originating node for subsequent use with data sent to the terminating node.

As shown and described herein, the originating node 20 can initiate communication with a terminating node 36, and thereafter send data to the terminating node. It should be understood, however, that after the communication connection is established between the originating node and terminating node, either the originating node or the terminating node can send data to the other node. More particularly, then, in addition to receiving data from the originating node, the terminating node can be capable of sending data to the originating node, such as in a reverse manner in which the originating node sends data to the terminating node.

As also shown and described herein, particularly with respect to FIG. 7, the intermediate node 22 can establish a tunnel with the terminating node 36 to thereby permit the originating node 20 to subsequently communicate with the terminating node through the intermediate node in a manner that avoids requiring the use of the NAT/FW 28, including the ALG of the NAT/FW. It should be understood, however, that any of a number of additional or alternative techniques can be utilized to permit the originating node to communicate with the terminating node through the intermediate node in a manner that avoids requiring the use of the NAT/FW, including the ALG of the NAT/FW. Examples of such techniques include, for example, Simple Traversal of UDP Through NATs (STUN) (see IETF, RFC 3489), Realm Specific IP (RSIP) (see IETF, RFC 3102), Traversal Using Relay NAT (TURN) (see IETF Internet Draft<draft-rosenberg-midcom-turn-03.txt>), and Interactive Connectivity Establishment (ICE) (see IETF Internet Draft<draft-ietf-mmusic-ice-00.txt>).

As described above, the terminating node 36 can register itself with the intermediate 22 node in response to the terminating node being notified of incoming data, such as from an originating node 20. It should be understood, however, that the terminating node can register itself with the intermediate node independent of a notification of incoming data from a network entity. In this regard, the terminating node can be otherwise prompted to register with the intermediate node. For example, the terminating node can be pre-programmed to register with the intermediate node at one or more given times. Alternatively, for example, a user of the terminating node can be prompted, such as by a user of an originating node, to initiate the terminating node registering with the intermediate node. In such instances, the time(s) that the terminating node registers with the intermediate node can comprise times of anticipated incoming data to the terminating node. Also in such instances, the terminating node can register with the intermediate node such that the intermediate node creates a tunnel entry or registration entry that do not otherwise identify an originating node.

As also described above, the terminating node 36 can register itself with the intermediate node 22 such that the intermediate node assigns a public IP address to the terminating node and sets up a communication tunnel with the terminating node (see FIG. 7). Alternatively, the terminating node can register with the intermediate node such that the intermediate node operates as a proxy for communications between the originating node 20 and the terminating node (see FIG. 8). The manner that the terminating registers itself with the intermediate node can be established in a number of different manners. For example, the terminating node and intermediate node can be configured such that the terminating node registers itself with the intermediate node in a given manner. Alternatively, for example, the terminating node can specify, such as in the REGISTER message, the technique by which the terminating node desires to register with the intermediate node.

Additionally, as described above, the originating node 20 and intermediate node 22 can be located within a public network 12 or a private network 24, with the originating node alternatively capable of being located within a cellular network 30. Likewise, as described above, the terminating node can be located in a private network 24 or a cellular network. It should be appreciated that although one or more of the originating node, intermediate node and terminating node are capable of being located within the same type of network, one or more of the nodes can, but need not, be located within the same network. For example, the originating node can be located within a private network, while the intermediate node is located within a public network, or vice versa.

Alternatively, for example, the originating node can be located within a cellular network, while the intermediate node is located within a public or a private network. In another alternative example, the originating node can be located within one private network, while one or both of the intermediate node and terminating node are located in another private network.

As will be appreciated, however, irrespective of the network location of the originating node, intermediate node and terminating node, each node is capable of communicating with the other nodes in accordance with embodiments of the present invention. For example, in instances in which the intermediate node is located within a private network and the originating node is located within a public network, the intermediate node is capable of being reached by the originating node across the public network, such as in any of a number of different known manners. In this regard, a NAT/FW 28 can be capable of supporting the intermediate node, such as in the same manner described above for the terminating node.

Further, as described herein, the terminating node 36 is located behind a NAT/FW 28 from an originating node 20. It should be appreciated, however, that the terminating node can be located behind a firewall/gateway (FW) without a NAT between the terminating node and the originating node. In such instances, embodiments of the present invention can be capable of permitting the originating node to initiate communication with the terminating node via the intermediate node in instances in which the communication may otherwise be restricted by the FW, thereby maintaining the firewall and/or gateway functionality to the network including the terminal.

For example, as will be appreciated by those skilled in the art, a system 10 including a NAT for private/public address translation is typical of networks communicating in accordance with IP Version 4 (IPv4). It should be understood, however, that the system, or portions thereof, can alternatively be configured to communicate in accordance with IP Version 6 (IPv6), which supports longer IP addresses than IPv4. In this regard, because IPv6 supports longer IP addresses than IPv4, one or more of the private networks may not require a NAT to perform address/port translations. In such instances, the system may not include a NAT or NAT/FW, but instead include a firewall/gateway (FW) capable of operating as a security mechanism to an associated private network, such as in the same manner as described above. The system can then operate as described above, although the terminating node can have an associated public IPv6 address. As such, the source or destination of communications between the intermediate node and the terminating node, that otherwise identify a private IPv4 address of the terminating node and are translated by a NAT, can identify the public IPv6 address of the terminating node and pass without translation from a public IPv4 address to a private IPv4 address or vice versa.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
an originating node configured to initiate communication with a terminating node; and
an intermediate node located between the originating node and the terminating node,
wherein the originating node is configured to initiate communication with the terminating node in a manner based upon at least one parameter for communication with at least one of the intermediate node or the terminating node, wherein the originating node is configured to initiate communication by requesting communication with the terminating node via the intermediate node, or notifying the terminating node of incoming data independent of the intermediate node, wherein the originating node or the intermediate node is configured to notify the terminating node of incoming data when the originating node initiates communication by requesting communication with the terminating node via the intermediate node, and wherein the terminating node, upon being notified of incoming data, is configured to register with the intermediate node to thereby enable Internet Protocol (IP) communication between the originating node and the terminating node via the intermediate node.

2. A system according to claim 1, wherein the originating node is configured to notify the terminating node of incoming data further in accordance with a non-IP-based communication technique when the originating node initiates communication by notifying the terminating node of incoming data, and wherein the originating node or the intermediate node is configured to notify the terminating node of incoming data further in accordance with a non-IP-based communication technique when the originating node initiates communication by requesting communication with the terminating node via the intermediate node.

3. system according to claim 2, wherein non-IP based communication comprises at least one of oral communication, text messaging, radio frequency (RF) communication, short messaging service (SMS) communication, multimedia messaging service (MMS) communication, or instant messaging.

4. A system according to claim 1, wherein the originating node is configured to notify the terminating node of incoming data further in accordance with at least one wireless communication technique when the originating node initiates communication by notifying the terminating node of incoming data, and wherein the originating node or the intermediate node is configured to notify the terminating node of incoming data further in accordance with the at least one wireless communication technique when the originating node initiates communication by requesting communication with the terminating node via the intermediate node.

5. A system according to claim 1, wherein the originating node is configured to initiate communication, and thereafter communicate, with the terminating node in accordance with a plurality of different communication techniques.

6. A system according to claim 1, wherein the originating node is configured to request communication with the terminating node via the intermediate node sending a domain name service (DNS) query to at least one of a plurality of DNS servers to thereby trigger the at least one of a plurality of DNS servers to communicate with the intermediate node to request communication with the terminating node.

7. A system according to claim 6, wherein the originating node is configured to send the DNS query to a first DNS server, wherein a second DNS server communicates with the intermediate node to request communication with the terminating node, and wherein the second DNS server comprises the first DNS server or a DNS server different from the first DNS server.

8. A system according to claim 1, wherein the intermediate node is configured to establish a tunnel with the terminating node in response to the terminating node registering with the intermediate node,
and wherein the originating node is configured to communicate with the terminating node at least partially via the tunnel.

9. A system according to claim 8, wherein the intermediate node is further configured to assign a public IP address to the terminating node,
and wherein the originating node is configured to communicate with the terminating node by sending data based upon the public IP address of the terminating node assigned by the intermediate node.

10. A system according to claim 8, wherein the intermediate node is configured to establish the tunnel based upon a registration message from the terminating node via at least one of a network address translator (NAT) or a firewall (FW) located between the intermediate node and the terminating node,
and wherein the originating node is configured to communicate with the terminating node at least partially via the tunnel in a manner independent of the at least one of the NAT or the FW.

11. A system according to claim 1, wherein the terminating node is configured to register with the intermediate node to thereby enable the intermediate node to create a registration entry that includes a public IP address assigned to the terminating node,
and wherein the originating node is configured to communicate with the terminating node to thereby enable the intermediate node to operate as a proxy based upon the registration entry.

12. A system according to claim 11, wherein the public IP address assigned to the terminating node comprises a public IP address assigned to the terminating node by a network address translator (NAT), wherein the intermediate node is configured to receive data from the originating node, and forwarding the data based upon the public IP address to thereby enable the NAT to transform the public IP address assigned to the terminating node into a private IP address associated with the terminating node, and thereafter forward the data from the NAT to the terminating node based upon the private IP address of the terminating node.

13. A system according to claim 1, wherein the originating node comprises a mobile terminal or a fixed terminal, and wherein the mobile terminal or fixed terminal is configured to notify the terminating node of incoming data.

14. A system according to claim 1, wherein the originating node or the intermediate node comprises a Session Initiation Protocol (SIP) client, and wherein the SIP client is configured to communicate with a SIP proxy to thereby trigger the SIP proxy to notify the terminating node of incoming data.

15. A system according to claim 1 further comprising:
at least one of a network address translator (NAT) or a firewall (FW) located between the intermediate node and the terminating node,
wherein the originating node or the intermediate node is configured to communicate with the at least one of the NAT or FW to thereby trigger the at least one of the NAT or FW to notify the terminating node of incoming data.

16. A system according to claim 15, wherein the originating node or the intermediate node is configured to communicate with the at least one of the NAT or FW to thereby enable the at least one of the NAT or FW to communicate with a network gateway support node to thereby trigger the network gateway support node to notify the terminating node of incoming data.

17. A system according to claim 1, wherein the originating node or the intermediate node is configured to communicate with another network node to thereby trigger the other network node to notify the terminating node of incoming data.

18. A method comprising:
receiving a notification of incoming data at a terminating node from an originating node or an intermediate node located between the originating node and the terminating node; and
registering the terminating node with the intermediate node in response to receiving the notification at the terminating node to thereby enable Internet Protocol (IP) communication between the originating node and the terminating node via the intermediate node.

19. A method according to claim 18, wherein notifying the terminating node comprises notifying the terminating node of incoming data further in accordance with a non-IP-based communication technique.

20. A method according to claim 19, wherein notifying the terminating node comprises notifying the terminating node of incoming data further in accordance with at least one of oral communication, text messaging, radio frequency (RF) communication, short messaging service (SMS) communication, multimedia messaging service (MMS) communication, or instant messaging.

21. A method according to claim 18, wherein notifying the terminating node comprises notifying the terminating node of incoming data further in accordance with at least one wireless communication technique.

22. A method according to claim 18 further comprising:
communicating between the originating node and the terminating node, wherein notifying the terminating node and communicating between the originating node and terminating node occur in accordance with a plurality of different communication techniques.

23. A method according to claim 18 further comprising:
requesting communication with the terminating node from the originating node via the intermediate node by sending a domain name service (DNS) query to at least one of a plurality of DNS servers to thereby trigger the at least one of a plurality of DNS servers to communicate with the intermediate node to thereby enable the intermediate node to notify the terminating node of incoming data.

24. A method according to claim 23, wherein requesting communication comprises requesting communication with the terminating node from the originating node via the intermediate node by sending a DNS query to a first DNS server to thereby trigger a second DNS server to communicate with the intermediate node to thereby enable the intermediate node to notify the terminating node of incoming data, and wherein the second DNS server comprises the first DNS server or a DNS server different from the first DNS server.

25. A method according to claim 18 further comprising:
establishing a tunnel between the intermediate node and the terminating node in response to registering the terminating node with the intermediate node; and
communicating between the originating node and the terminating node at least partially via the tunnel.

26. A method according to claim 25, wherein registering the terminating node includes assigning a public IP address to the terminating node, and wherein communicating comprises sending data from the originating node to the terminating node based upon the public IP address assigned to the terminating node.

27. A method according to claim 25, wherein establishing a tunnel comprises establishing a tunnel based upon a registration message from the terminating node via at least one of a network address translator (NAT) or a firewall (FW) located between the intermediate node and the terminating node,
and wherein communicating comprises communicating between the originating node and the terminating node at least partially via the tunnel in a manner independent of the at least one of the NAT or the FW.

28. A method according to claim 18, wherein registering the terminating node comprises registering the terminating node to thereby enable the intermediate node to create a registration entry that includes a public IP address assigned to the terminating node, and wherein the method further comprises:
communicating between the originating node and the terminating node via the intennediate node to thereby enable the intermediate node to operate as a proxy based upon the registration entry.

29. A method according to claim 28, wherein the public IP address assigned to the terminating node comprises a public IP address assigned to the terminating node by a network address translator (NAT), and wherein communicating comprises:
receiving data from the originating node at the intermediate node; and
forwarding the data based upon the public IP address to thereby enable the NAT to transform the public IP address assigned to the terminating node into a private IP address associated with the terminating node, and thereafter forwarding the data from the NAT to the terminating node based upon the private IP address of the terminating node.

30. A method according to claim 18, wherein the originating node comprises a mobile terminal or a fixed terminal, and wherein receiving a notification comprises receiving a notification from the mobile terminal or fixed terminal.

31. A method according to claim 18, wherein the originating node or the intermediate node comprises a Session Initiation Protocol (SIP) client, and wherein receiving a notification comprises receiving a notification from a SIP proxy in response to the SIP proxy being triggered by the SIP client to notify the terminating node of incoming data.

32. A method according to claim 18, wherein receiving a notification comprises receiving a notification from at least one of a network address translator (NAT) or a firewall (FW) located between the intermediate node and the terminating node, and wherein receiving a notification comprises receiving a notification in response to the at least one of the NAT or FW being triggered by the originating node or the intermediate node to notify the terminating node of incoming data.

33. A method according to claim 32, wherein receiving a notification comprises receiving a notification from a network gateway support node in response to the network gateway support node being triggered by at least one of the NAT or FW to notify the terminating node of incoming data.

34. A method according to claim 18, wherein receiving a notification comprises receiving a notification from another network node in response to the other network node being triggered by the originating node or the intermediate node to notify the terminating node of incoming data.

35. An apparatus comprising:
a controller configured to receive a notification of incoming data from an originating node or an intermediate node located between the originating node and apparatus, wherein the controller is also configured to register the apparatus with the intermediate node in response to receiving the notification to thereby enable Internet Protocol (IP) communication between the originating node and the apparatus via the intermediate node.

36. An apparatus according to claim 35, wherein the controller is configured to receive the notification further in accordance with a non-IP-based communication technique.

37. An apparatus according to claim 36, wherein the controller is configured to receive the notification further in accordance with at least one of text messaging, radio frequency (RF) communication, short messaging service (SMS) communication, multimedia messaging service (MMS) communication, or instant messaging.

38. An apparatus according to claim 35, wherein the controller is configured to receive the notification further in accordance with at least one wireless communication technique.

39. An apparatus according to claim 35, wherein the controller is further configured to communicate with the originating node, and wherein the controller is configured to receive the notification and communicate with the originating node in accordance with a plurality of different communication techniques.

40. An apparatus according to claim 35, wherein the controller is configured to receive the notification in response to the originating node requesting communication with the apparatus via the intermediate node by sending a domain name service (DNS) query to at least one of a plurality of DNS servers to thereby trigger the at least one of a plurality of DNS servers to communicate with the intermediate node to thereby enable the intermediate node to send the notification to the apparatus.

41. An apparatus according to claim 40, wherein the controller is configured to receive the notification in response to the originating node requesting communication comprises requesting communication with the terminating node via the intermediate node by sending the DNS query to a first DNS server to thereby trigger a second DNS server to communicate with the intermediate node to thereby enable the intermediate node to notify the terminating node of incoming data, and wherein the second DNS server comprises the first DNS server or a DNS server different from the first DNS server.

42. An apparatus according to claim 35, wherein the controller is configured to register the apparatus to thereby enable the intermediate node to establish a tunnel between the intermediate node and the apparatus in response to registering the apparatus with the intermediate node, and wherein the controller is configured to communicate with the originating node at least partially via the tunnel.

43. An apparatus according to claim 42, wherein the controller is configured to register the apparatus to thereby enable the intermediate node to assign a public IP address to the apparatus, and wherein the controller is configured to receive data sent from the originating node to the apparatus based upon the public IP address assigned to the apparatus.

44. An apparatus according to claim 42, wherein the controller is configured to send a registration message to the intermediate node via at least one of a network address translator (NAT) or a firewall (FW) located between the intermediate node and the apparatus to thereby register the apparatus, and wherein the controller is configured to communicate with the originating node at least partially via the tunnel in a manner independent of the at least one of the NAT or the FW.

45. An apparatus according to claim 35, wherein the controller is configured to register the apparatus to thereby enable the intermediate node to create a registration entry that includes a public IP address assigned to the apparatus, and wherein the controller is configured to communicate with the originating node via the intermediate node to thereby enable the intermediate node to operate as a proxy based upon the registration entry.

46. An apparatus according to claim 45, wherein the public IP address assigned to the apparatus comprises a public IP address assigned to the apparatus by a network address translator (NAT), and wherein the controller is configured to communicate with the originating node to thereby enable the intermediate node to receive data from the originating node, and forward the data based upon the public IP address to thereby enable the NAT to transform the public IP address assigned to the apparatus into a private IP address associated with the apparatus, and thereafter forward the data from the NAT to the controller based upon the private IP address of the apparatus.

47. An apparatus according to claim 35, wherein the originating node comprises a mobile apparatus or a fixed apparatus, and wherein the controller is configured to receive the notification from the mobile apparatus or fixed apparatus.

48. An apparatus according to claim 35, wherein the originating node or the intermediate node comprises a Session Initiation Protocol (SIP) client, and wherein the controller is configured to receive the notification from a SIP proxy in response to the SIP proxy being triggered by the SIP client to notify the apparatus of incoming data.

49. An apparatus according to claim 35, wherein the controller is configured to receive the notification from at least one of a network address translator (NAT) or a firewall (FW) located between the intermediate node and the apparatus, and wherein the controller is configured to receive the notification in response to the at least one of the NAT or FW being triggered by the originating node or the intermediate node to notify the apparatus of incoming data.

50. An apparatus according to claim 49, wherein the controller is configured to receive the notification from a network gateway support node in response to the network gateway support node being triggered by at least one of the NAT or FW to notify the apparatus of incoming data.

51. An apparatus according to claim 35, wherein the controller is configured to receive the notification from another network node in response to the other network node being triggered by the originating node or the intermediate node to notify the apparatus of incoming data.

52. A system comprising:
a network address translator (NAT) located between an originating node and a terminating node, wherein the NAT is configured to receive a communication request from a network node, and in response to the connection request, notify the terminating node of incoming data to thereby enable the terminating node to register with an intermediate node located between the originating node and the NAT to thereby enable Internet Protocol (IP) communication between the originating node and the terminating node via the intermediate node.

53. A system according to claim 52, wherein the NAT is configured to notify the terminating node via a network gateway support node of a network including the terminating node.

54. A system according to claim 52, wherein the NAT is configured to receive the communication request from the originating node or the intermediate node.

55. A system according to claim 52 further comprising:
an intermediate node configured to establish a tunnel with the terminating node in response to the terminating node registering with the intermediate node to thereby enable the originating node to communicate with the terminating node at least partially via the tunnel.

56. A system according to claim 55, wherein the intermediate node is further configured to assign a public IP address to the terminating node to thereby enable the originating node to communicate with the terminating node by sending data based upon the public IP address of the terminating node assigned by the intermediate node.

57. A system according to claim 55, wherein the intermediate node is configured to establish the tunnel based upon a registration message from the terminating node via the NAT, and wherein the intermediate node is configured to establish a tunnel with the terminating node to permit the originating node to communicate with the terminating node at least partially via the tunnel in a manner independent of the NAT.

58. A system according to claim 54 further comprising:
an intermediate node configured to receive a registration message from the terminating node, and thereafter create a registration entry that includes a public IP address assigned to the terminating node, wherein the intermediate node is configured to operate as a proxy during communication between the originating node and the terminating node based upon the registration entry.

59. An apparatus comprising;
a receiving means for receiving a notification of incoming data from an originating node or an intermediate node located between the originating node and the apparatus; and
a registering means for registering the apparatus with the intermediate node in response to the receiving means receiving the notification to thereby enable Internet Protocol (IP) communication between the originating node and the apparatus via the intermediate node.

\* \* \* \* \*

UNITED STATES PATENT AND TRADEMARK OFFICE
CERTIFICATE OF CORRECTION

PATENT NO. : 7,599,374 B2 Page 1 of 1
APPLICATION NO. : 10/797529
DATED : October 6, 2009
INVENTOR(S) : Pöyhönen et al.

It is certified that error appears in the above-identified patent and that said Letters Patent is hereby corrected as shown below:

Column 22,

Line 65, before "system" insert --A--.

Column 25,

Line 48, "intennediate" should read --intermediate--.

Column 26,

Line 30, before "apparatus" insert --the--.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,599,374 B2 Page 1 of 1
APPLICATION NO. : 10/797529
DATED : October 6, 2009
INVENTOR(S) : Pöyhönen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1549 days.

Signed and Sealed this

Fourteenth Day of December, 2010

David J. Kappos
*Director of the United States Patent and Trademark Office*